(12) United States Patent
Mukasa (10) Patent No.: US 7,881,579 B2
(45) Date of Patent: Feb. 1, 2011

(54) OPTICAL TRANSMISSION SYSTEM AND DISPERSION-COMPENSATING OPTICAL FIBER

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/208,951

(22) Filed: Sep. 11, 2008

(65) Prior Publication Data

US 2009/0046984 A1    Feb. 19, 2009

Related U.S. Application Data

(63) Continuation of application No. PCT/JP2008/051750, filed on Feb. 4, 2008.

(30) Foreign Application Priority Data

| Feb. 2, 2007 | (JP) | ................. 2007-024671 |
| Dec. 13, 2007 | (JP) | ................. 2007-321796 |

(51) Int. Cl.
*G02B 6/032* (2006.01)
*H04B 10/12* (2006.01)

(52) U.S. Cl. ................. 385/125; 398/148

(58) Field of Classification Search ................. 385/125; 398/148
See application file for complete search history.

(56) References Cited

U.S. PATENT DOCUMENTS

| 6,526,209 | B1 | 2/2003 | Hasegawa et al. |
| 6,993,228 | B2 * | 1/2006 | Burke et al. ................. 385/123 |
| 7,043,127 | B2 * | 5/2006 | Hasegawa et al. ........... 385/125 |
| 2001/0028775 | A1 * | 10/2001 | Hasegawa et al. ........... 385/127 |
| 2001/0038740 | A1 | 11/2001 | Hasegawa et al. |
| 2002/0041746 | A1 | 4/2002 | Kato et al. |
| 2003/0156809 | A1 * | 8/2003 | Tsukitani et al. ............ 385/123 |
| 2004/0170437 | A1 | 9/2004 | Hasegawa et al. |

FOREIGN PATENT DOCUMENTS

| JP | 2002-071995 | * | 9/2000 |
| JP | 2002-071995 | A | 3/2002 |
| WO | WO 01/63328 | A1 | 8/2001 |

OTHER PUBLICATIONS

U.S. Appl. No. 12/406,592, Mar. 18, 2009, Mukasa.

(Continued)

*Primary Examiner*—Uyen-Chau N Le
*Assistant Examiner*—Kajli Prince
(74) *Attorney, Agent, or Firm*—Oblon, Spivak, McClelland, Maier & Neustadt, L.L.P.

(57) ABSTRACT

An optical transmission system employs an optical fiber as an optical transmission path that includes a holey fiber and a dispersion-compensating optical fiber. The holey fiber includes a core region that is formed at a center of the holey fiber and a cladding region having a plurality of holes around the core region at regular intervals. The dispersion-compensating optical fiber is connected close to the holey fiber and that collectively compensates wavelength dispersion of the holey fiber at an operation wavelength in at least two wavelength bands out of O band, E band, S band, C band, and L band within a predetermined range depending on a transmission rate.

10 Claims, 10 Drawing Sheets

OTHER PUBLICATIONS

Kiyoyuki Yokoyama, et al., "Numerical Analysis of Confinement Loss including Bending Effects for Holey Fibers", Technical Report of IEICE, OFT2004-104-116, Jan. 28, 2005, vol. 104, No. 605, pp. 67-72.

Kazuhide Nakajima, et al., "Ultra Wide Band 190 Gbit/s WDM Transmission over a Long Length and Low Loss PCF", PDP23, NTT Corporation, 2004, 3 pages.

K. Ieda, et al., "Visible to Infrared WDM Transmission over PCF", NTT Corporation, 2006, 2 pages.

Kenji Kurokawa, et al., "Penalty-free dispersion-managed soliton transmission over 100 km low loss PCF", PDP21, NTT Corporation, 2005, 3 pages.

U.S. Appl. No. 12/720,469, filed Mar. 9, 2010, Mukasa.

* cited by examiner

| No. | Δ1 % | Δ2 % | Δ3 % | α | a/c | b/c | 2c μm | D ps/nm²/km | Slope ps/nm²/km | DPS nm | Aeff μm² | λc nm | INFLECTION-POINT WAVELENGTH nm |
|---|---|---|---|---|---|---|---|---|---|---|---|---|---|
| 1 | 2.4 | -0.6 | 0.2 | 6 | 0.18 | 0.55 | 13.0 | -248.9 | -0.669 | 374 | 16.5 | 1213 | 1590 |
| 2 | 2.4 | -0.5 | 0.3 | 8 | 0.2 | 0.7 | 11.1 | -215.4 | -0.577 | 373 | 15.79 | 1022 | 1590 |
| 3 | 2.4 | -0.5 | 0.1 | 6 | 0.2 | 0.6 | 11.5 | -179.0 | -0.482 | 372 | 14.57 | 739 | 1650 |
| 4 | 2.4 | -0.4 | 0.2 | 6 | 0.2 | 0.7 | 11.2 | -176.0 | -0.386 | 457 | 15.93 | 823 | 1620 |
| 5 | 2.4 | -0.5 | 0.2 | 8 | 0.3 | 0.9 | 7.4 | -170.8 | -0.481 | 355 | 13.97 | 737 | 1690 |
| 6 | 2.4 | -0.5 | 0.4 | 8 | 0.3 | 0.9 | 7.4 | -170.8 | -0.384 | 444 | 14.42 | 737 | 1670 |
| 7 | 2.4 | -0.5 | 0.1 | 4 | 0.3 | 0.8 | 8.1 | -159.4 | -0.365 | 436 | 15.01 | 731 | 1670 |
| 8 | 2.4 | -0.4 | 0.1 | 3 | 0.2 | 0.6 | 12.6 | -154.7 | -0.353 | 438 | 16.49 | 753 | 1630 |
| 9 | 2.4 | -0.5 | 0.1 | 2 | 0.2 | 0.5 | 14.3 | -154.0 | -0.399 | 386 | 16.98 | 969 | 1610 |
| 10 | 2.2 | -0.3 | 0.4 | 4 | 0.2 | 0.8 | 12.3 | -148.1 | -0.324 | 457 | 18.42 | 1102 | 1620 |
| 11 | 2 | -0.5 | 0.1 | 3 | 0.2 | 0.5 | 14.6 | -140.6 | -0.385 | 365 | 17.90 | 990 | 1610 |
| 12 | 1.8 | -0.5 | 0.1 | 4 | 0.2 | 0.5 | 14.8 | -133.2 | -0.374 | 356 | 18.71 | 1003 | 1620 |
| 13 | 2.2 | -0.4 | 0.1 | 1.5 | 0.2 | 0.5 | 16.1 | -125.0 | -0.307 | 408 | 20.60 | 1109 | 1610 |
| 14 | 1.6 | -0.5 | 0.1 | 8 | 0.2 | 0.5 | 14.7 | -119.5 | -0.303 | 394 | 19.33 | 997 | 1620 |
| 15 | 2.4 | -0.5 | 0.1 | 1.5 | 0.4 | 0.9 | 7.8 | -111.4 | -0.304 | 366 | 16.13 | 733 | 1680 |
| 16 | 2.2 | -0.4 | 0.1 | 2 | 0.3 | 0.8 | 10 | -100.3 | -0.251 | 399 | 15.99 | 739 | 1690 |

FIG.9

| No. | Λ | neff | D | Slope | Aeff | BENDING LOSS |
|---|---|---|---|---|---|---|
| | μm | | ps/nm/km | ps/nm²/km | μm² | dB/m |
| 17 | 8 | 1.44184 | 31.2 | 0.0696 | 74.7 | $1.9 \times 10^{-3}$ |
| 18 | 12 | 1.44323 | 26.2 | 0.0673 | 163.1 | 51.4 |

|  |  | EXAMPLE 1 | EXAMPLE 2 |
|---|---|---|---|
| $\Delta 1$ | % | 2.4 | 2.5 |
| $\Delta 2$ | % | -0.6 | -0.57 |
| $\Delta 3$ | % | 0.2 | 0.26 |
| $\alpha$ |  | 8 | 6 |
| a/c |  | 0.175 | 0.19 |
| b/c |  | 0.55 | 0.54 |
| 2c | $\mu m$ | 12.95 | 12.9 |
| D | ps/nm/km | -255.2 | -177 |
| Slope | ps/nm²/km | -0.675 | -0.502 |
| Aeff | $\mu m^2$ | 16.4 | 13.4 |
| BENDING LOSS | dB/m | 5.0 | 1.0 |
| $\lambda c$ | nm | 1209 | 1211 |

|  |  | EXAMPLE 1 | EXAMPLE 2 |
|---|---|---|---|
| TRANSMISSION LOSS | dB/km | 0.642 | 0.731 |
| D | ps/nm/km | -227.9 | -176.4 |
| Slope | ps/nm²/km | -0.722 | -0.531 |
| Aeff | μm² | 16.5 | 13.9 |
| BENDING LOSS | dB/m | 15.0 | 0.2 |
| λc | nm | 1292 | 1249 |

FIG.16

| WAVELENGTH [nm] | EXAMPLE 1 | EXAMPLE 2 |
|---|---|---|
| 1380 | 5.473 | 6.370 |
| 1570 | 0.654 | 0.663 |
| 1590 | 0.760 | 0.620 |
| 1600 | 0.885 | 0.603 |
| 1610 | 1.083 | 0.591 |
| 1630 | 1.956 | 0.611 |

OPTICAL TRANSMISSION SYSTEM AND DISPERSION-COMPENSATING OPTICAL FIBER

CROSS-REFERENCE TO RELATED APPLICATIONS

This application is a continuation of PCT/JP2008/051750 filed on Feb. 4, 2008, the entire content of which are incorporated herein by reference.

BACKGROUND OF THE INVENTION

1. Field of the Invention

The present invention relates to an optical transmission system using an optical fiber as an optical transmission path and a dispersion-compensating optical fiber for the optical transmission system.

2. Description of the Related Art

A holey fiber is a new type of optical fiber including a core region formed at a center of the optical fiber and a cladding region having a plurality of holes that are arranged around the core region at regular intervals, where the holes reduce the average refractive index of the cladding region. The light is transmitted in the core region by the principle of the total reflection of light. The holey fiber can achieve special characteristics such as an endlessly single mode (ESM), which cannot be achieved by a conventional optical fiber, by controlling the refractive index using the holes. In the ESM, there is no cutoff wavelength and a light having any wavelength can be transmitted in single mode. In other words, in the holey fiber, a light signal having a wavelength in any one of the band from 1260 nm to 1360 nm and the E band from 1360 nm to 1460 nm, as well as the S band from 1460 nm to 1530 nm, the C band from 1530 nm to 1565 nm, and the L band from 1565 nm to 1610 nm can be transmitted in single mode, enabling a high-speed optical transmission over a broad bandwidth.

Results of broadband optical transmission tests using broadband characteristics of the holey fiber have been reported (see, for example, K. Nakajima, et al., "Ultra wide band 190 Gbit/s WDM transmission over a long length and low loss PCF", Proc. OFC PDP23 (2004) and K. Ieda, et al., "Visible to Infrared WDM transmission over PCF", ECOC2006-Tu3.3.4 (2006)). In addition, a result of a test of dispersed-managed Soliton transmission at a transmission rate of 10 Gb/s, in which an optical transmission path of 100 km including a holey fiber and a dispersion-compensating optical fiber is used, has been reported (see, for example, K. Kurokawa, et al., "Penalty-Free Dispersion-Managed Soliton Transmission over 100 km Low Loss PCF", Proc. OFC PDP21 (2005)).

However, according to the first two literatures, optical transmission is performed without compensating a large wavelength dispersion of the holey fiber. Therefore, high transmission rate cannot be achieved and a transmission distance is short. On the other hand, according to the third literature, the wavelength dispersion of the holey fiber is compensated using a dispersion-compensating optical fiber. However, only the C band is used as an operation wavelength band for optical transmission and the broadband characteristics of the holey fiber are not utilized.

SUMMARY OF THE INVENTION

It is an object of the present invention to at least partially solve the problems in the conventional technology.

According to an aspect of the present invention, there is provided an optical transmission system employing an optical fiber as an optical transmission path that includes a holey fiber and a dispersion-compensating optical fiber. The holey fiber includes a core region that is formed at a center of the holey fiber and a cladding region having a plurality of holes around the core region at regular intervals. The dispersion-compensating optical fiber is connected close to the holey fiber and that collectively compensates wavelength dispersion of the holey fiber at an operation wavelength in at least two wavelength bands out of O band, E band, S band, C band, and L band within a predetermined range depending on a transmission rate.

Furthermore, according to another aspect of the present invention, there is provided a dispersion-compensating optical fiber including a center core region; an inner core layer that is formed around the center core region and that has a refractive index smaller than a refractive index of the center core region; an outer core layer that is formed around the inner core layer and that has a reflective index lower the refractive index of the center core region and higher than the refractive index of the inner core layer; and a cladding layer that is formed around the outer core layer and that has a refractive index higher than the refractive index of the inner core layer and lower than the refractive index of the outer core layer. A relative index difference between the center core region and the cladding layer is 1.4% to 3.0%, a relative index difference between the inner core layer and the cladding layer is −1.0% to −0.1%, a relative index difference between the outer core layer and the cladding layer is 0.1% to 0.5%, a value α that defines a shape of the center core region is equal to or larger than 1.5, a ratio of diameter of the center core region to outer diameter of the outer core layer is 0.1 to 0.4, and a ratio of outer diameter of the inner core layer to the outer diameter of the outer core layer is 0.3 to 0.9.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical transmission system and a dispersion-compensating optical fiber according to the present invention are explained in detail below with reference to the accompanying drawings. The embodiments do not limit the present invention. Hereinafter, a holey fiber is abbreviated as HF and a dispersion-compensating optical fiber is abbreviated as DCF. In the description, a bending loss means a bending loss on a condition that an optical fiber is wound around a diameter of 20 mm for 16 times. A cutoff wavelength is the fiber cutoff wavelength defined by the ITU-T (International Telecommunication Union Telecommunication Standardization Sector) G.650.1. Other words not specifically defined in the description follow definitions and measuring methods of the ITU-T G.650.1.

Figure 1:
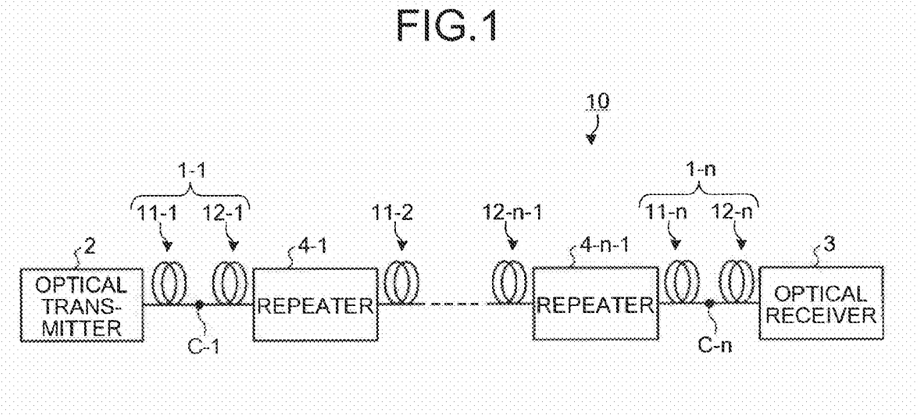
FIG. 1 is a block diagram of an optical transmission system according to an embodiment of the present invention.

FIG. 1 is a block diagram of an optical transmission system according to an embodiment of the present invention. As shown in FIG. 1, an optical transmission system 10 according to the embodiment includes an optical transmitter 2 that transmits an optical signal, repeaters 4-1 to 4-n-1 each of which reproduces and relays the optical signal received from the optical transmitter 2, an optical receiver 3 that receives the optical signal reproduced and relayed from the repeater 4-n-1, and optical transmission paths 1-1 to 1-n for transmitting the optical signal that are connected to the optical transmitter 2 and the repeaters 4-1 to 4-n-1, where n is an integer equal to or larger than "2".

The optical transmission paths 1-1 to 1-n include HFs 11-1 to 11-n, and DCFs 12-1 to 12-n that are connected to the HFs 11-1 to 11-n at connection points C-1 to C-n. The optical transmission paths 1-1 to 1-n except for the HFs 11-1 to 11-n and the DCFs 12-1 to 12-n are formed with, for example, standard single-mode optical fibers.

Figure 2:
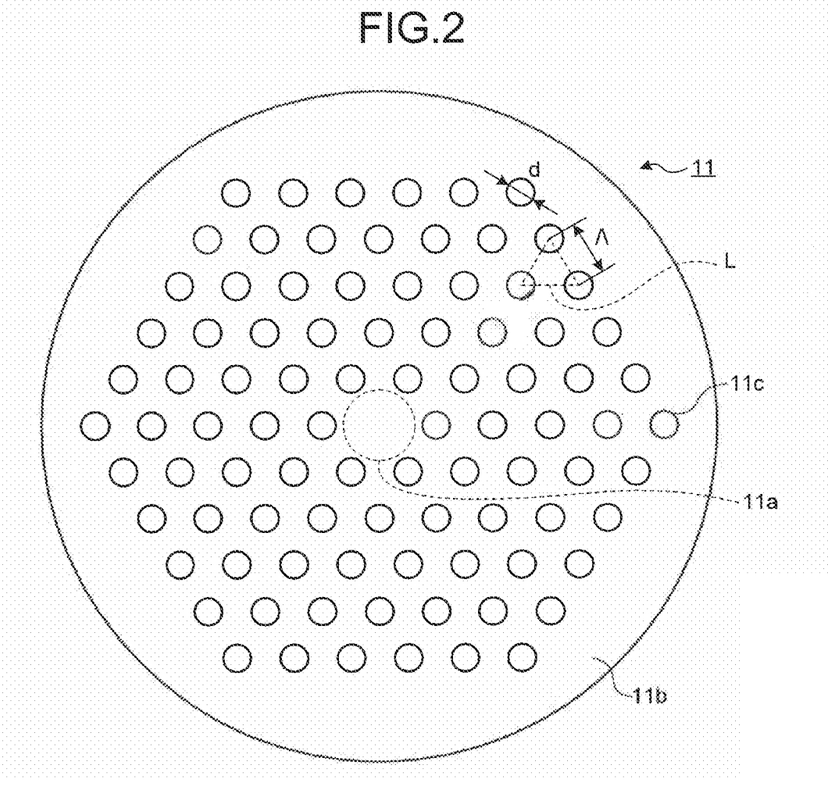
FIG. 2 is a schematic cross section of an HF according to the embodiment of the present invention.

FIG. 2 is a schematic cross section of an HF 11 according to the embodiment. Each of the HFs 11-1 to 11-n has the same configuration as that of the HF 11. As shown in FIG. 2, the HF 11 includes a core region 11a at a center portion thereof and a cladding region 11b formed around the core region 11a. The cladding region 11b has a plurality of holes 11c arranged around the core region 11a at regular intervals. The core region 11a and the cladding region 11b are made of silica glass. The holes 11c are arranged such that a triangular lattice L is formed and a relation of d/Λ=about 0.5 (0.35 to 0.65) is satisfied, where d [μm] is diameter of the hole 11c and Λ [μm] is lattice constant of the triangular lattice L. The holes 11c are arranged to form the triangular lattice L, so that hexagonal layers are formed to surround the core region 11a. The HF 11 has five layers. As a result, the HF 11 effectively shows ESM characteristics as the holey fibers disclosed in the first two literatures. In other words, the HF 11 has broadband characteristics in which a signal light of any one of the wavelength bands from the O band to the L band can be transmitted in single mode. The closer to 0.5 d/Λ is, it is more preferable. If d/Λ is 0.35 to 0.65, similar effects as those of the HFs disclosed in the first two literatures can be obtained. Furthermore, if Λ is 10 μm, a large effective area $A_{eff}$ of 114.6 μm$^2$ and a small bending loss of 1.6 dB/m are achieved at a wavelength of, for example, 1550 nm. Therefore, the HF 11 has low optical nonlinearity and is suitable for an optical fiber cable. The effective refractive index neff at the wavelength of 1550 nm is 1.44273. The optical characteristics of the HF 11 explained above are based on results of calculation by a finite element method (FEM) simulation.

Figure 3:
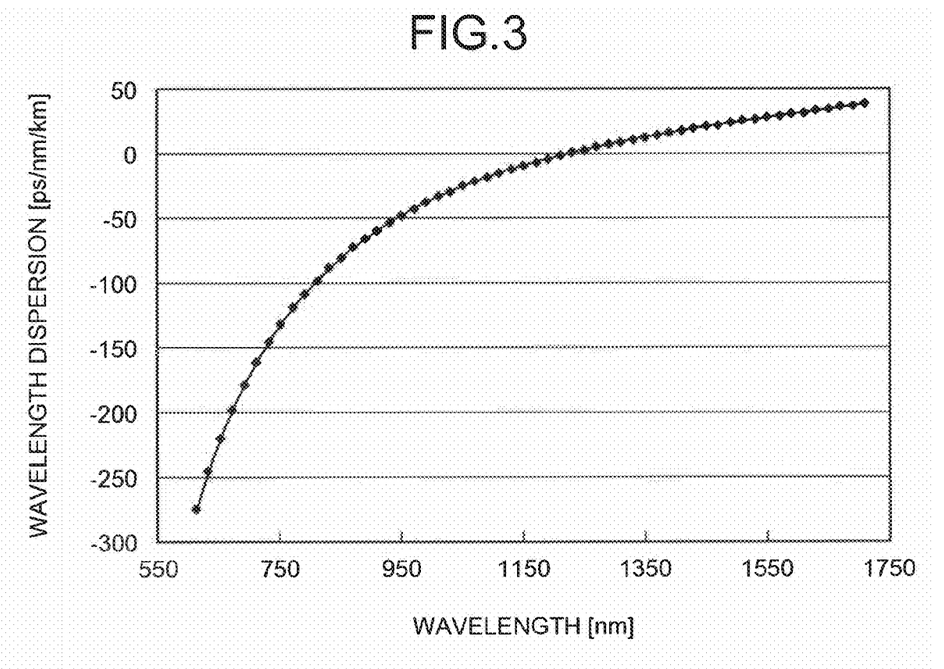
FIG. 3 is a graph of wavelength dispersion characteristics of the HF shown in FIG. 2.
Figure 4:
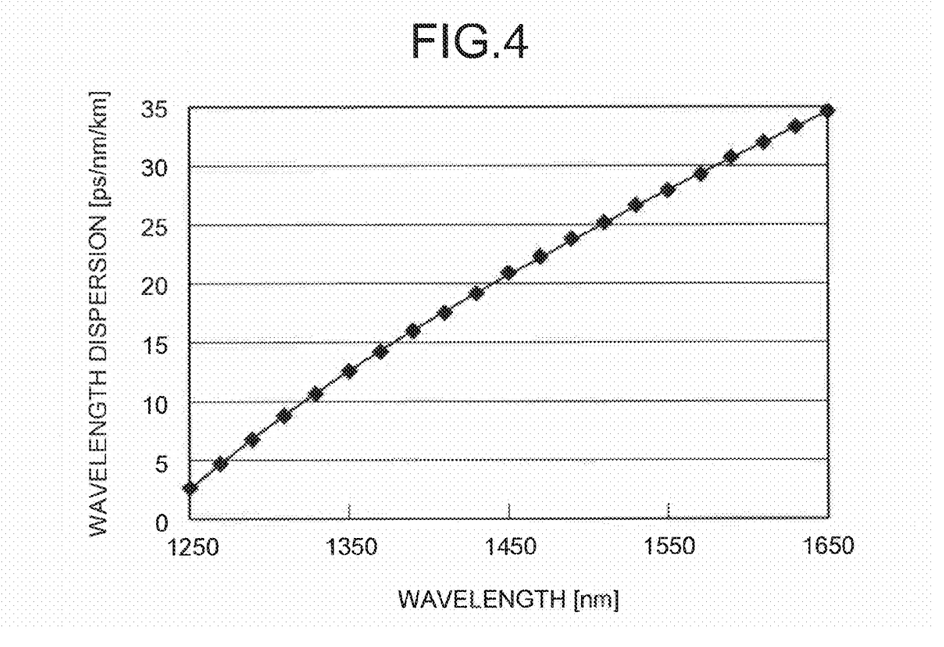
FIG. 4 is a graph of wavelength dispersion characteristics of the HF shown in FIG. 2.

FIGS. 3 and 4 are graphs of wavelength dispersion characteristics of the HF 11. As shown in FIGS. 3 and 4, a dispersion curve of the wavelength dispersion characteristics of the HF 11 has a smaller gradient with an increase in wavelength. The HF 11 has a wavelength dispersion of 28.0 ps/nm/km and a dispersion slope of 0.0681 ps/nm$^2$/km at the wavelength of 1550 nm.

Figure 5:
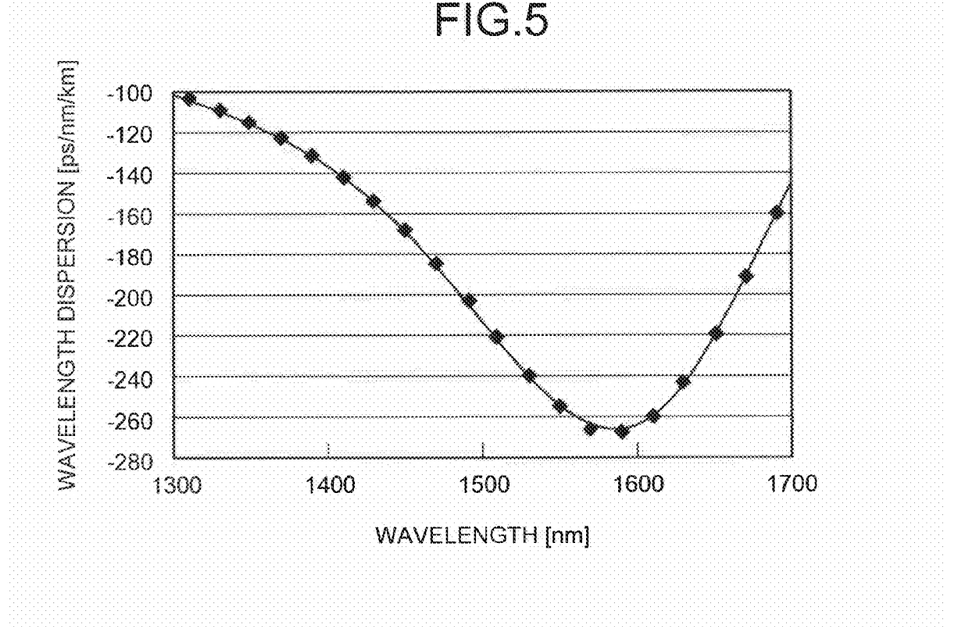
FIG. 5 is a graph of wavelength dispersion characteristics of a DCF according to the embodiment of the present invention.

FIG. 5 is a graph of wavelength dispersion characteristics of a DCF 12 according to the embodiment. Each of the DCFs 12-1 to 12-n has the same configuration as that of the DCF 12. As shown in FIG. 5, the DCF 12 has a wavelength dispersion of −100 ps/nm/km or less at least over wavelength bands from a part of the O band to the L band, has a wavelength dispersion of −255.2 ps/nm/km and a dispersion slope of −0.675 ps/nm$^2$/km at the wavelength of 1550 nm, and has a DPS of 378 nm, which is a value obtained by dividing the wavelength dispersion by the dispersion slope. The dispersion curve of the wavelength dispersion characteristics of the DCF 12 has an inflection point at which the dispersion slope changes from a negative value to a positive value. As a result, the dispersion curve of the DCF 12 has a shape in which the dispersion slope of a positive value is on a long wavelength side with respect to the inflection point.

Figure 6:
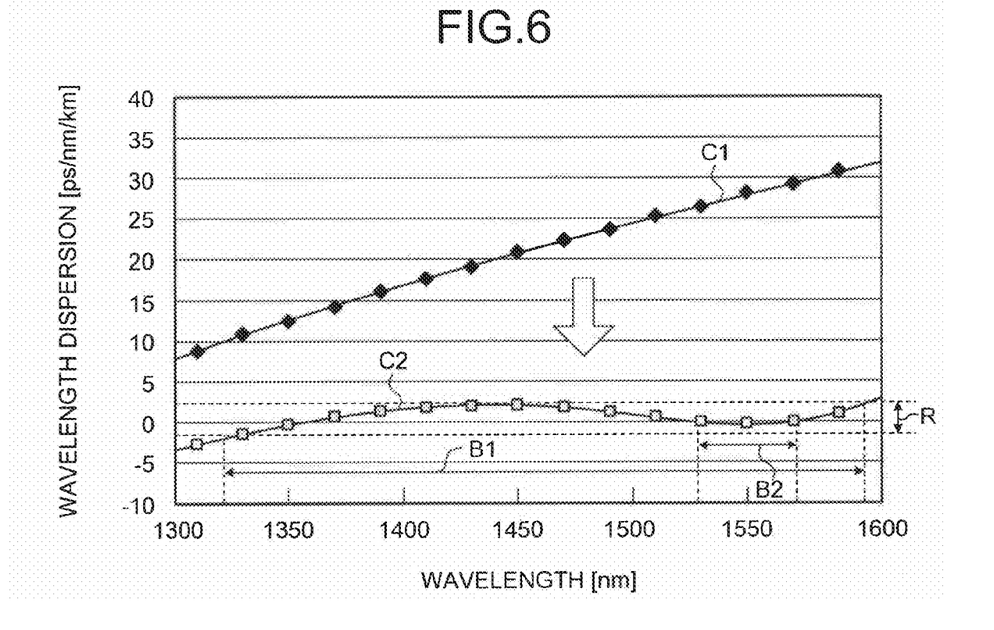
FIG. 6 is a graph of a dispersion curve of the HF shown in FIG. 2 and an average dispersion curve of an optical transmission path obtained by connecting the HF and the DCF shown in FIG. 5.

FIG. 6 is a graph of the dispersion curve of the HF 11 and an average dispersion curve of an optical transmission path 1 obtained by connecting the HF 11 and the DCF 12. A reference symbol C1 denotes the dispersion curve of the HF 11 and a reference symbol C2 denotes a dispersion curve of the optical transmission path 1. The HF 11 has a length of 100 km and the DCF 12 has a length of 11.1 km. In the dispersion curve of the optical transmission path 1, as shown in FIG. 6, because the DCF 12 compensates the wavelength dispersion of the HF 11, the wavelength dispersion is within a range R at a wavelength within a range from 1320 nm to 1600 nm, i.e., over a wavelength range B1 of 280 nm including a part of the O band, the E band, the C band, and the L band. Specifically, an absolute value of the wavelength dispersion is within a range of 2 ps/nm/km or less. As a result, in the optical transmission path 1, optical transmission over a transmission distance of 100 km at least at a transmission rate of 10 Gb/s can be performed with an operation wavelength band from the part of the O band to the L band using a signal light having a predetermined wavelength of the operation wavelength band.

Particularly, in a wavelength band B2, an absolute value of the wavelength dispersion is 0.15 ps/nm/km or less and faster optical transmission can be achieved. A predetermined value corresponding to the transmission rate can be set as the range R. For example, when the absolute value of the wavelength dispersion is within a range of 10 ps/nm/km or less, the transmission rate of about 10 Gb/s can be achieved. When the absolute value of the wavelength dispersion is within a range of 5 ps/nm/km or less, a signal can be transmitted for 20 km or more at a transmission rate of 40 Gb/s.

For example, as shown in FIGS. 3 and 4, because the HF 11 originally has a small absolute value of 10 ps/nm/km of the wavelength dispersion, dispersion compensation by the DCF 12 is unnecessary. Therefore, it is preferable that the operation wavelength band include both of the wavelength band B1 in which dispersion is compensated by the DCF 12 and a wavelength band in which the absolute value of the wavelength dispersion of the HF 11 depending on a transmission rate is small, because optical transmission over broader bandwidth can be achieved. By appropriately designing the wavelength dispersion characteristics of the DCF 12, dispersion of the entire O band can be compensated on a short wavelength side or dispersion of the entire L band can be compensated on the long wavelength side.

Figure 7:
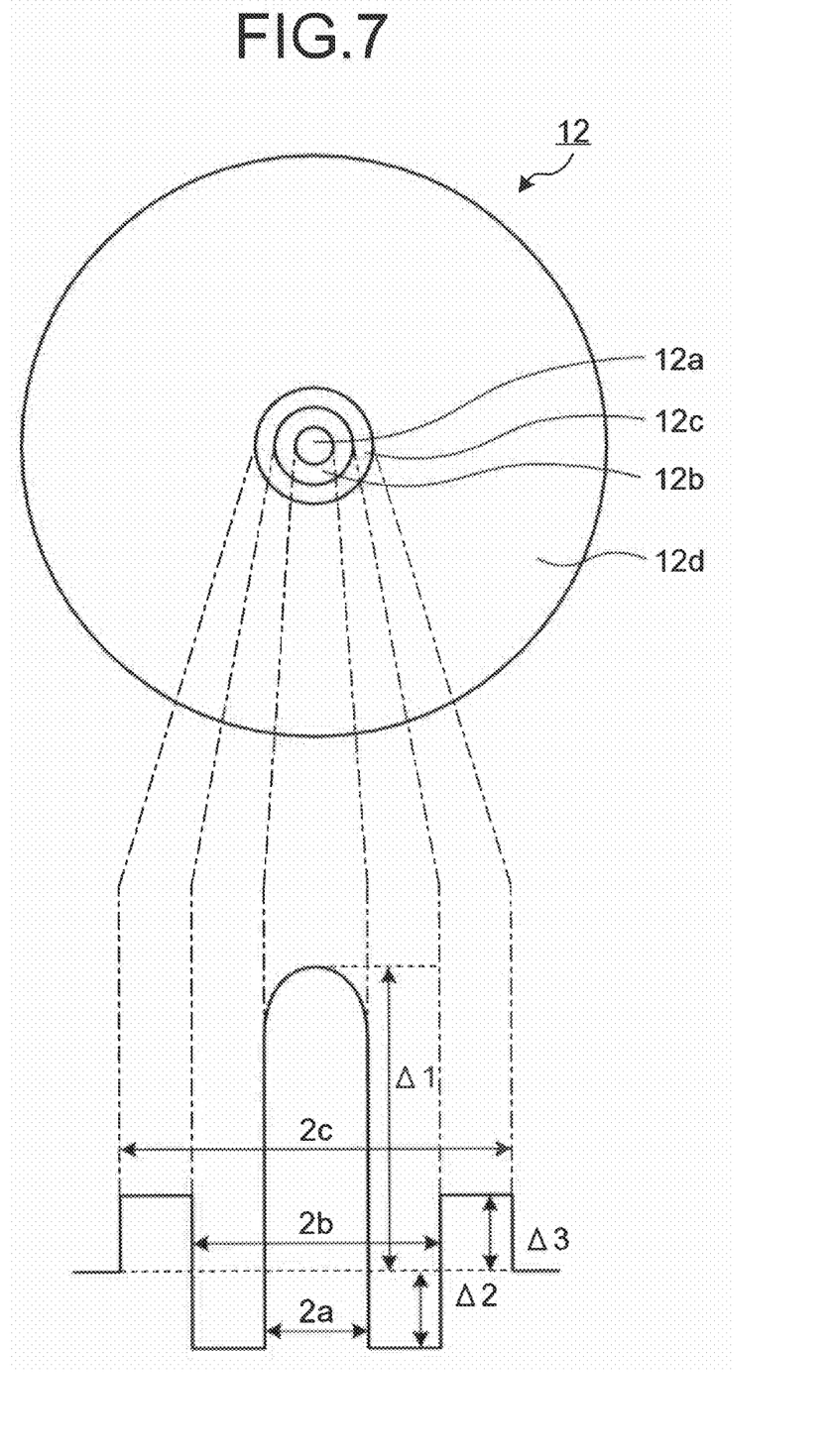
FIG. 7 is a schematic diagram of a cross section of the DCF according to the embodiment of the present invention and a refractive index profile corresponding to the cross section.

The DCF 12 according to the embodiment is explained more in detail below. FIG. 7 is a schematic diagram of a cross section of the DCF 12 and a refractive index profile corresponding to the cross section. The DCF 12 includes a center core region 12a, an inner core layer 12b that is formed around the center core region 12a and that has a refractive index lower than that of the center core region 12a, an outer core layer 12c that is formed around the inner core layer 12b and that has a reflective index lower than that of the center core region 12a and higher than that of the inner core layer 12b, and a cladding layer 12d that is formed around the outer core layer 12c and that has a refractive index higher than that of the inner core layer 12b and lower than that of the outer core layer 12c. A relative index difference Δ1 between the center core region 12a and the cladding layer 12d is 2.4%, a relative index difference Δ2 between the inner core layer 12b and the cladding layer 12d is −0.6%, and a relative index difference Δ3 between the outer core layer 12c and the cladding layer 12d is 0.2%. In addition, a value α that defines a shape of the center core region 12a is 8, and a ratio a/c of a diameter 2a of the center core region 12a to an outer diameter 2c of the outer core layer 12c is 0.175, a ratio b/c of an outer diameter 2b of the inner core layer 12b to the outer diameter 2c of the outer core layer 12c is 0.55, and the outer diameter 2c of the outer core layer 12c is 12.95 μm.

Because the DCF 12 has the above configuration and refractive index profile, the dispersion curve shown in FIG. 5 is obtained. The DCF 12 has an effective area Aeff of 16.4 μm² and a bending loss of 5.0 dB/m. The DCF 12 has a cutoff wavelength of 1209 nm and operates in single mode at the shortest wavelength in the wavelength band B1.

When the DCF is used not only for dispersion compensation by also as a Raman amplification medium, it is required to use a cutoff wavelength shorter than an operation wavelength by 100 nm or more because it is required to use a light having a wavelength shorter than a wavelength of the signal light as an excitation light. Because the DCF has a cutoff wavelength of 1209 nm as explained above, it can be used as a Raman amplifier medium for a signal light having the wavelength of 1320 nm that is the shortest wavelength of the wavelength band B1. It is preferable that the cutoff wavelength of the DCF be 1360 nm or less, because, in this case, the DCF can be used as a Raman amplifier medium for a signal light of the S band.

The value α can be defined by Equation (1).

$$n^2(r) = n_{core}^2 \times \{1 - 2 \times (\Delta/100) \times (r/a)^\alpha\} \text{ (where } 0 < r < a) \quad (1)$$

In Equation (1), r is a point from the center of the center core region in a radial direction, n(r) is the refractive index at the position r, $n_{core}$ is the refractive index at r=0 in the center core region, and a is the radius of the center core region. In addition, the "^" is a symbol representing an exponential.

Figure 8:
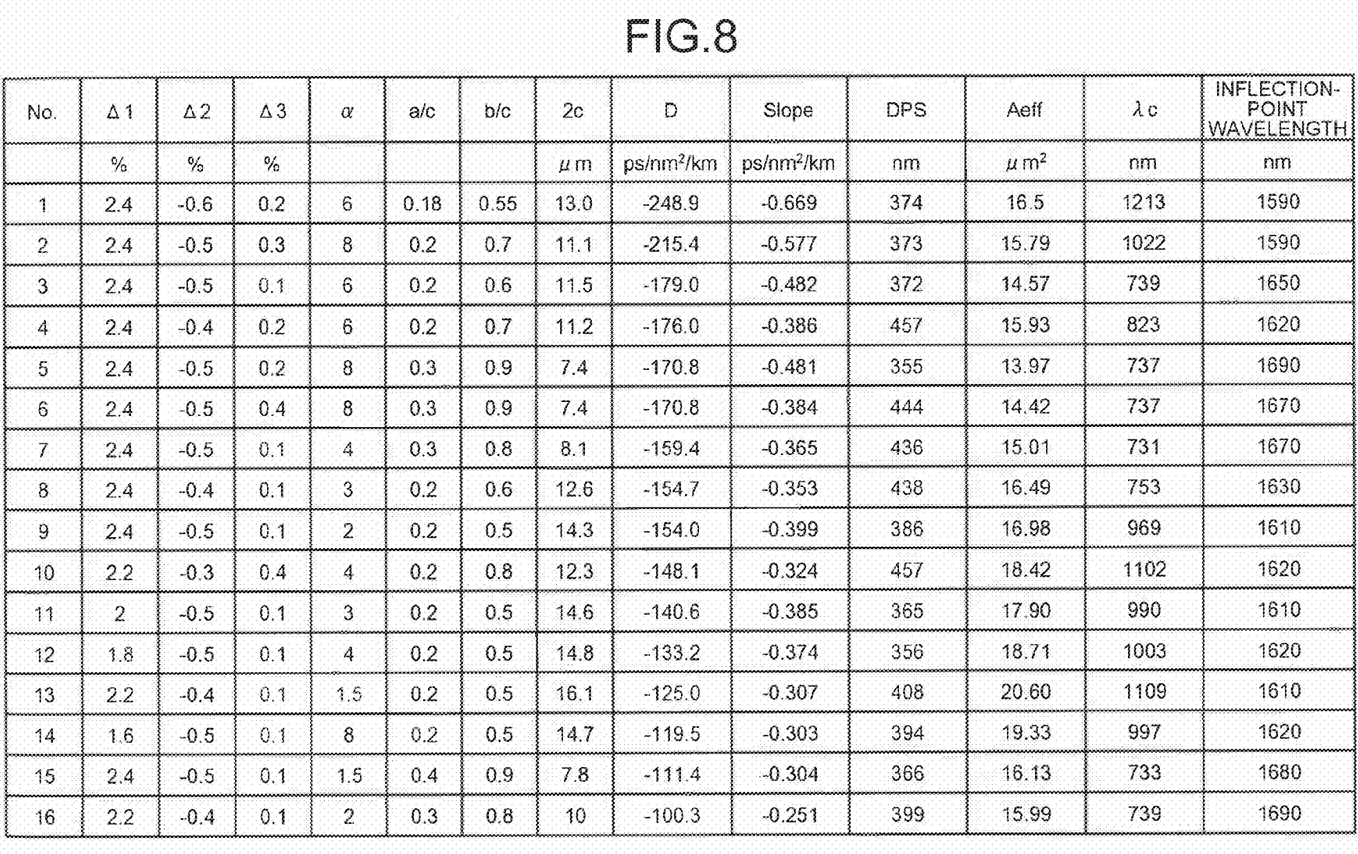
FIG. 8 is a table of design parameters and optical characteristics of DCFs according to further embodiments of the present invention.

The refractive index profile of the DCF 12 is not limited to the above one. FIG. 8 is a table of design parameters that define the refractive index profiles of DCFs according to further embodiments and optical characteristics of the DCFs at the wavelength of 1550 nm. The wavelength of 1550 nm is most frequently used as an operation wavelength. Reference symbols "D", "Slope", and "$\lambda_c$" shown in FIG. 8 denote wavelength dispersion, dispersion slope, and cutoff wavelength, respectively. As shown in FIG. 8, when the relative refractive index Δ1 is 1.4% to 3.0%, the relative refractive index Δ2 is −1.0% to −0.1%, the relative refractive index Δ3 is 0.1% to 0.5%, the value α is 1.5 or more, the ratio a/c is 0.1 to 0.4, and the ratio b/c is 0.3 to 0.9, the cutoff wavelength is shorter than the shortest wavelength in the wavelength band B1 by 100 nm or more, a predetermined negative wavelength dispersion is achieved as well as a dispersion curve having an inflection point at a predetermined wavelength. As a result, by connecting each of the DCF close to the HF 11, the wavelength dispersion of the HF 11 in at least two of the wavelength bands out of the O band to the L band are collectively compensated within a predetermined range depending on the transmission rate.

Figure 9:
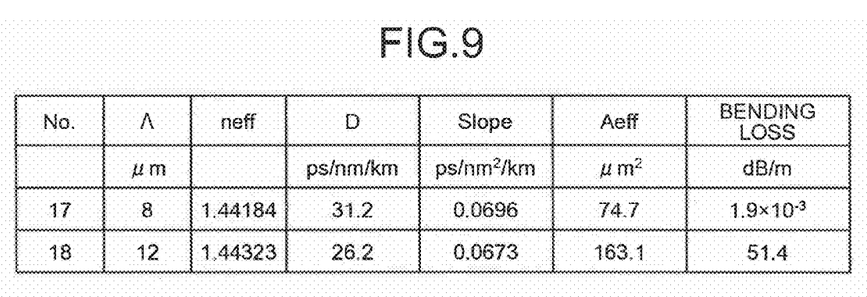
FIG. 9 is a table of optical characteristics of HFs according to still further embodiments of the present invention.

The HF of the present invention is not limited to one having Λ of 10 μm. FIG. 9 is a table of optical characteristics of HFs according to still further embodiments of the present invention. Each of the HFs of FIG. 9 has d/Λ of 0.5. An HF 17 has Λ of 8 μm and an HF 18 has Λ of 12 μm. As shown in FIG. 9, when Λ is 8 μm to 12 μm, the HF has a large effective area of 45 μm² or more and a sufficiently small bending loss. Therefore, the HF has a small optical nonlinearity and is suitable for an optical fiber cable.

Figure 10:
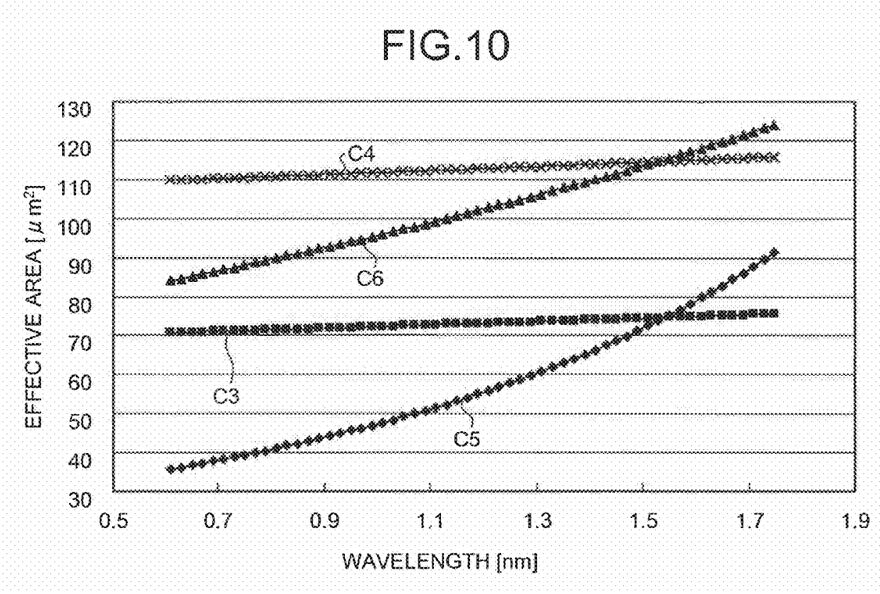
FIG. 10 is a graph of wavelength-dependent effective areas of the HFs of the present invention and conventional single mode optical fibers.

FIG. 10 is a graph of wavelength-dependent effective areas of the HFs of the present invention and conventional single mode optical fibers. Reference symbols "C3", "C4", "C5", and "C6" shown in FIG. 11 denote respectively wavelength characteristics curves of the HF 17 of FIG. 9, the HF 11 shown in FIG. 2, a standard single-mode optical fiber, and a single-mode optical fiber having a so-called W-type refractive index profile and a large effective area. As shown in FIG. 10, the HF of the present invention has an effective area that is less wavelength dependent compared to the conventional fiber, and is suitable for broadband optical transmission. Particularly because the HF of the present invention has an effective area of 45 μm² or more, and furthermore, 60 μm² or more, the HF can be used as an optical fiber with an optical nonlinearity over a broad bandwidth and suitable for high-speed optical transmission.

Figure 11:
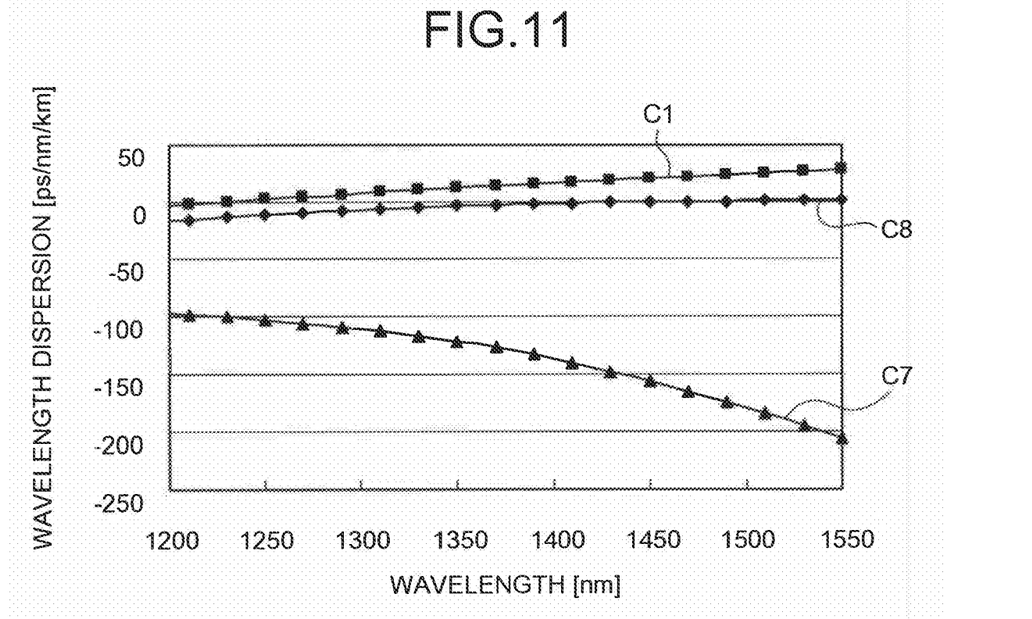
FIG. 11 is a graph of a dispersion curve obtained by combining a conventional DCF for the C band and the HF according to the embodiment.

FIG. 11 is a graph of a dispersion curve obtained by combining a conventional DCF for the C band and the HF according to the embodiment. The wavelength dispersion of the DCF for the C band at the wavelength of 1550 nm is −205 ps/nm/km. Reference symbols "C1", "C7", and "C8" denote respectively a dispersion curve of the HF 11, a dispersion curve of the DCF for the C band, and an average dispersion curve of an optical transmission path obtained by connecting the HF 11 and the DCF for the C band. As shown in FIG. 11, the dispersion curve of the DCF for the C band has a gradient that increases with an increase in the wavelength. As a result, the optical transmission path obtained by connecting the HF 11 and the DCF for the C band has a remarkably large residual dispersion on the short wavelength side and is not suitable for broadband long-haul optical transmission. Further more, the DCF for the C band is normally designed to achieve a cutoff wavelength close to the lowest wavelength in the C band. Because a light having a wavelength shorter than the C band is transmitted in multimode, the DCF for the C band is not suitable for optical transmission.

As examples of the present invention, two types of optical transmission paths (Examples 1 and 2) obtained from one type of HF and two types of DCFs that are manufactured based on the embodiments are explained below.

Figure 12:
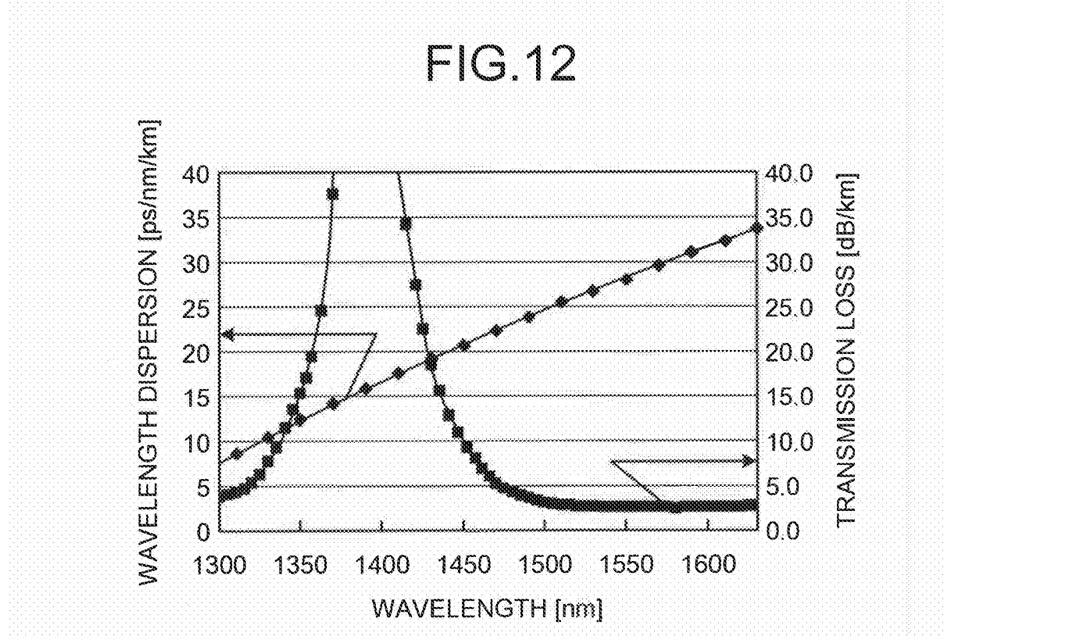
FIG. 12 is a graph of wavelength dispersion characteristics and transmission loss characteristics of an HF commonly used for Examples.

Characteristics of the HF commonly used for Examples are explained below. The HF basically has the same configuration as that of the HF 11 shown in FIG. 2 and has d/Λ of 0.50 and Λ of 10 μm. FIG. 12 is a graph of wavelength dispersion characteristics and transmission loss characteristics of the HF commonly used for Examples. A peak of the transmission loss at a wavelength close to 1380 nm results from an absorption loss because of an OH group in the HF. As shown in FIG. 12, the wavelength dispersion characteristics well agree with the results of calculation shown in FIGS. 3 and 4. Specifically, the characteristics of the common HF at the wavelength of 1550 nm include a wavelength dispersion of 28.02 ps/nm/km and a dispersion slope of 0.0667 ps/nm$^2$/km. The transmission loss at the wavelength of 1550 nm was about 2.62 dB/km. The HF having a length of 1 km was measured, and it was found that light propagation does not occur in a higher-order mode at a wavelength up to 836 nm. Because an HF having a length of 1 km or more is used in an actual optical transmission system, a light can be transmitted in a fundamental mode in the HF even when performing broadband optical transmission at a wavelength up to about 846 nm. A sufficiently small bending loss of 0.004 dB/m at the wavelength of 1550 nm was achieved. Although a bending loss of an HF usually increases on the short wavelength side, a design value of the bending loss of the common HF in a band of 1.0 μm is less than 5 dB/m and broadband optical transmission can be achieved without any problem concerning the bending loss. The effective area was 10 μm$^2$ and well agreed with a result of calculation.

Figure 13:
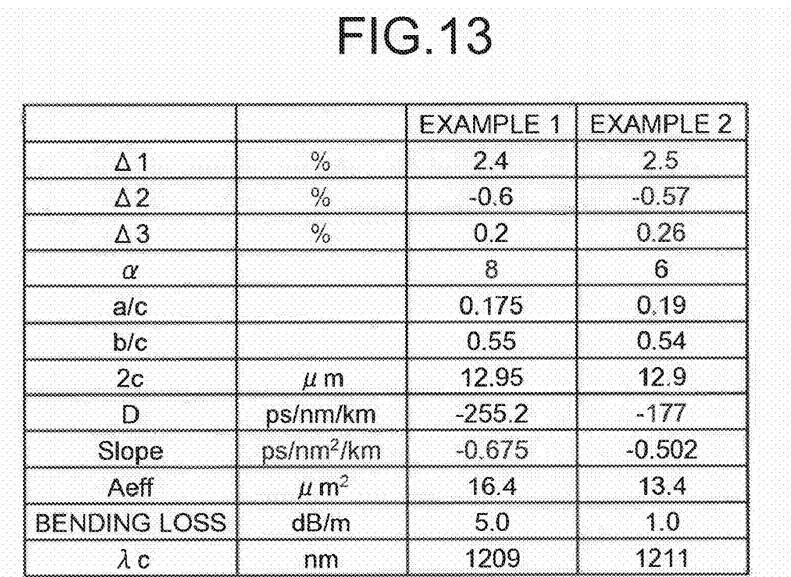
FIG. 13 is a table of design parameters that define refractive index profiles of DCFs of Examples 1 and 2 and calculated optical characteristics thereof at a wavelength of 1550 nm.

The characteristics of the DCFs of Examples 1 and 2 are explained below. Each of the DCFs of Examples 1 and 2 has the configuration shown in FIG. 7. FIG. 13 is a table of design parameters that define refractive index profiles of the DCFs of Examples 1 and 2 and calculated optical characteristics thereof at the wavelength of 1550 nm. The DCFs of Examples 1 and 2 basically have the same configuration as that shown in FIG. 7. The DCF of Example 1 has the same design parameters as those of the DCF of the embodiment. A wavelength at an infection point of the DCF of Example 1 was 1590 nm and that of Example 2 was 1630 nm.

Figure 14:
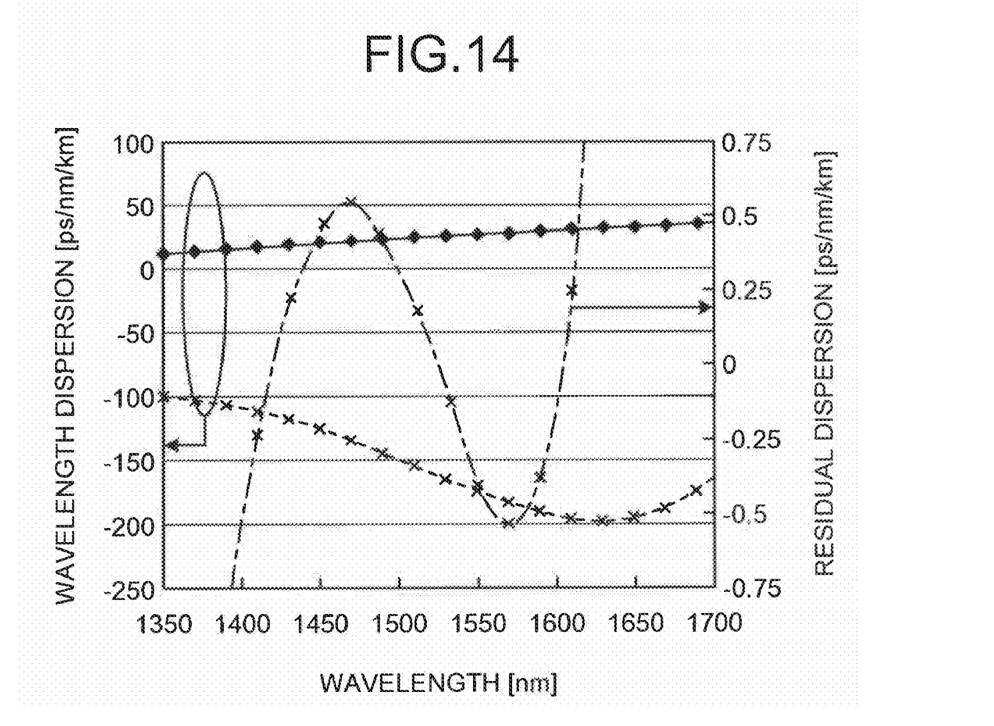
FIG. 14 is a graph of dispersion curves of the HF commonly used for Examples and the DCF of Example 2 and a residual dispersion curve that is an average dispersion curve of the optical transmission path obtained by connecting the HF and the DCF.

FIG. 14 is a graph of dispersion curves of the HF commonly used for Examples and the DCF of Example 2 and a residual dispersion curve that is an average dispersion curve of the optical transmission path obtained by connecting the HF and the DCF. Results of calculation based on the design parameters are shown in FIG. 14 in which a solid line expresses the dispersion curve of the HF, a dotted line expresses the dispersion curve of the DCF, and an alternate long and short dash line expresses the residual dispersion curve. The HF has a length of 100 km and the DCF has a length of 11.1 km. As shown in FIG. 14, according to the calculation of Example 2, an absolute value of the residual dispersion at a wavelength within a range from 1390 nm to 1620 nm, i.e., over a range of 230 nm, is within a range of 0.5 ps/nm/km or less.

Figure 15:
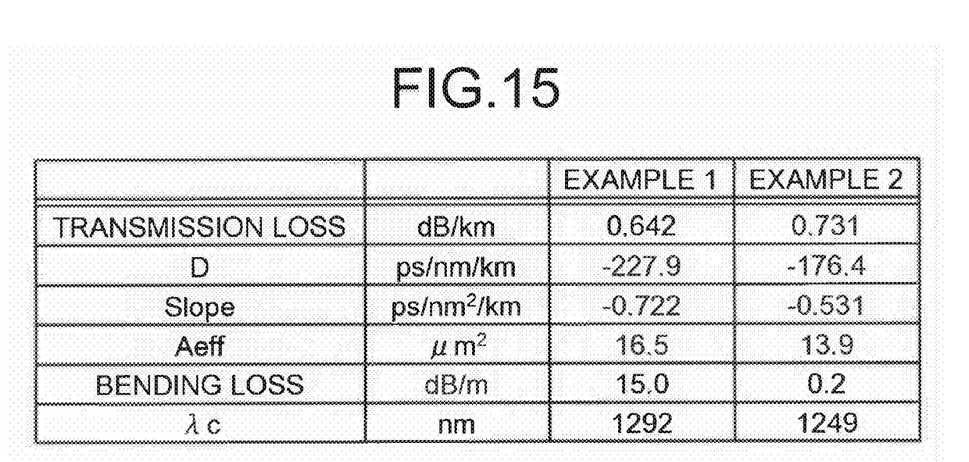
FIG. 15 is a table of measured characteristics of the DCFs of Examples 1 and 2.
Figure 16:
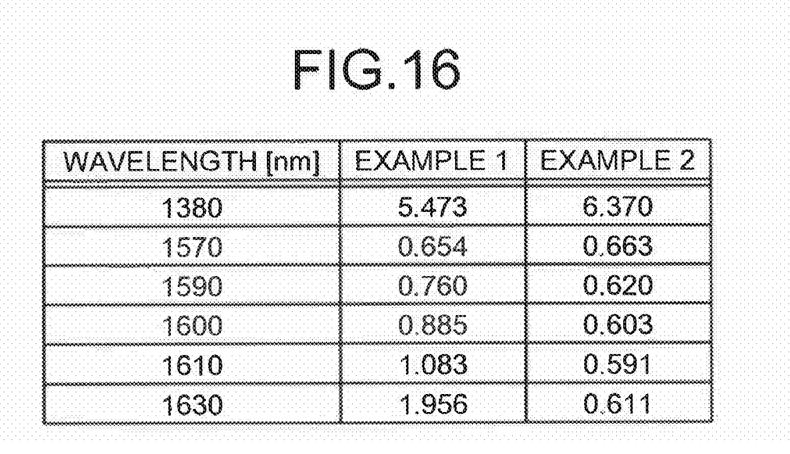
FIG. 16 is a table of measured transmission losses of the DCFs of Examples 1 and 2 at each wavelength.

Characteristics of the DCFs of Examples 1 and 2 that were actually manufactured are explained below. FIG. 15 is a table of measured characteristics of the DCFs of Examples 1 and 2. FIG. 16 is a table of measured transmission losses of the DCFs of Examples 1 and 2 at each wavelength. Comparing FIG. 13 to FIG. 15, it was found that the characteristics of the DCFs of Examples 1 and 2 that were actually manufactured were similar to the results of calculation based on the design parameters. As shown in FIG. 16, it was found that there were no significant increase in transmission loss of the DCFs of Examples 1 and 2 on the long wavelength side. It was also found that each of the DCFs of Examples 1 and 2 had a polarization mode dispersion (PMD) of about 0.2 ps/√km that is a non-problematic value.

Figure 17:
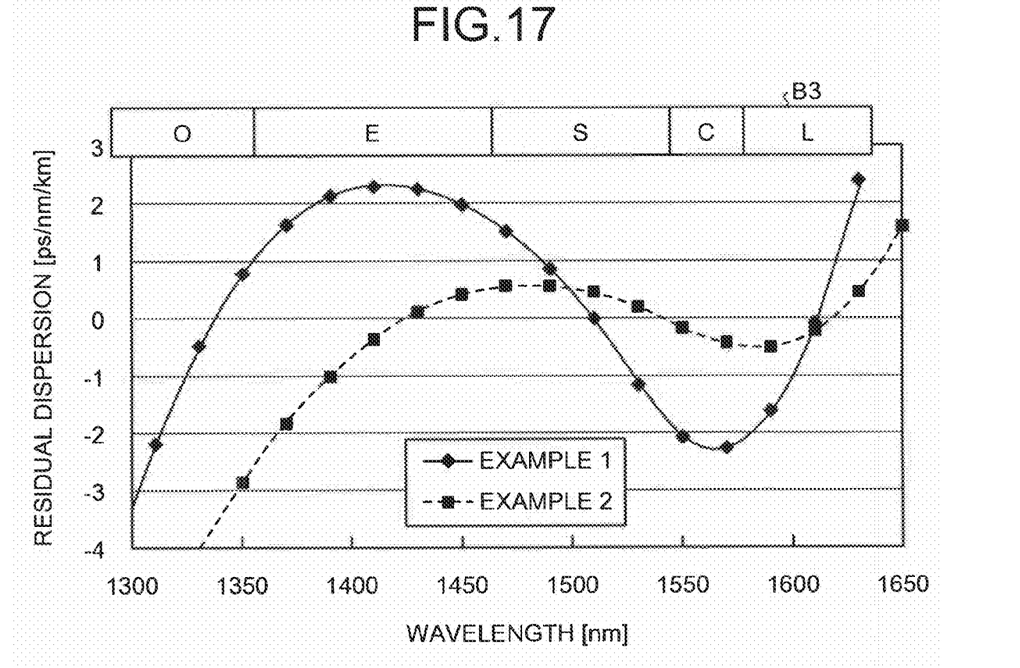
FIG. 17 is a graph of residual dispersion curves of optical transmission paths of Examples 1 and 2.

Residual dispersion of optical transmission paths of Examples 1 and 2 are explained below. FIG. 17 is a graph of residual dispersion curves of the optical transmission paths of Examples 1 and 2. The HF and the DCF of Example 1 respectively have a length of 100 km and a length of 11.1 km as in the case of FIG. 6. The HF and the DCF of Example 2 respectively have a length of 100 km and a length of 11.1 km as in the case of FIG. 14. A reference symbol B3 denotes bands from the O band to the L band.

As shown in FIG. 17, the optical transmission path of Example 1 had an absolute value of the residual dispersion within a range of 2.2 ps/nm/km or less at a wavelength within the range of 1320 nm to 1620 nm, i.e., over a range of 300 nm. It can be found that the residual dispersion characteristics of the optical transmission path of Example 1 well agree with results of calculation shown in FIG. 6. The optical transmission path of Example 2 had an absolute value of the residual dispersion within a range of 0.55 ps/nm/km or less at a wavelength within a range from 1400 nm to 1640 nm, i.e., over a range of 240 nm. It can be found that the residual dispersion characteristics of the optical transmission path of Example 2 well agree with results of calculation shown in FIG. 14.

A DCF designed to have a smaller absolute value of residual dispersion compared with that of Example 1 is used as the DCF of Example 2 instead of narrowing the band in which the wavelength dispersion is compensated. The DCF designed as explained above reduces a bending loss as shown in FIG. 15. DCFs that are appropriately designed depending on demands with respect to, for example, a band in which the wavelength dispersion is compensated, an absolute value of difference in residual dispersion, and a bending loss.

The HF 11 of the embodiments has five layers, and preferably has three to seven layers. Loss characteristics of an HF that has Λ of 10 μm and d/Λ of 0.5 as the HF 11 shown in FIG. 2 and that has different number of hole layers are explained below.

Figure 18:
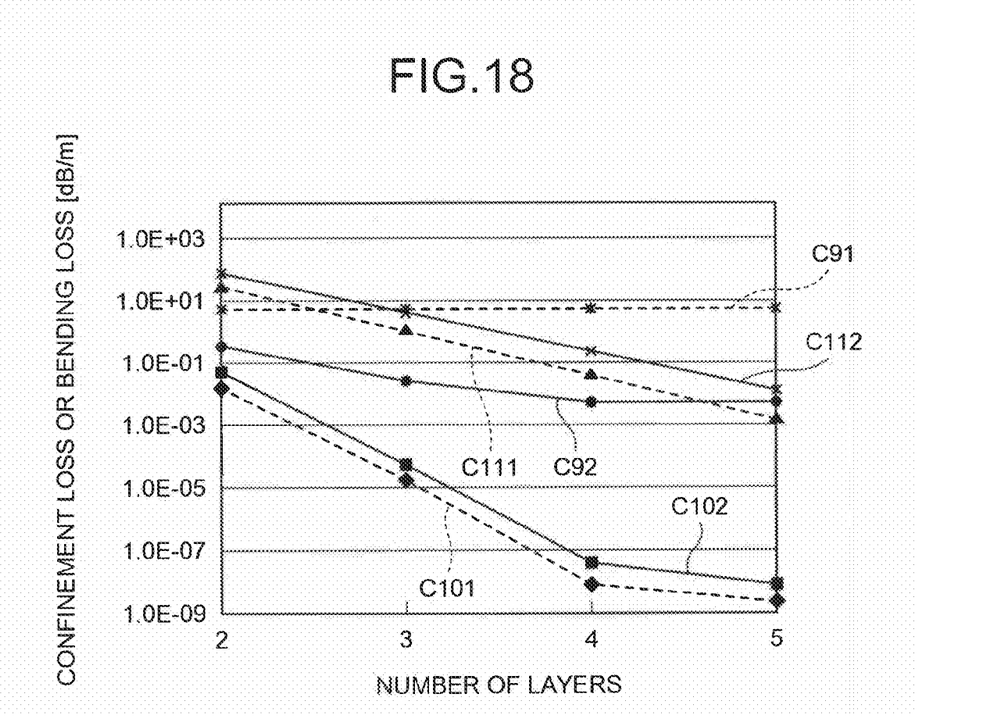
FIG. 18 is a graph of relation between the number of layers, a confinement loss of a fundamental mode and a higher-order mode of optical transmission, and a bending loss of the fundamental mode in HFs with different number of hole layers.

FIG. 18 is a graph of relation between the number of layers, a confinement loss of a fundamental mode and a higher-order mode of optical transmission, and a bending loss of the fundamental mode in HFs with different number of hole layers. Reference symbols C91 and C92 denote respectively curves of bending loss characteristics of a fundamental mode at wavelengths of 1.05 μm and 1.55 μm. Reference symbols C101 and C102 denote respectively curves of confinement loss characteristics of a fundamental mode at wavelengths of 1.05 μm and 1.55 μm. Reference symbols C111 and C112 denote curves of confinement loss characteristics of a lowest higher-order mode at wavelengths of 1.05 μm and 1.55 μm, respectively.

It is preferable that the confinement loss of the fundamental mode of the HF be smaller because a smaller confinement loss leads to a smaller transmission loss. Furthermore, it is preferable that the confinement loss of the higher-order mode be larger because, even if a light in the higher-order mode is excited, the light is attenuated sufficiently during propagation with the larger confinement loss and no influence is caused on the propagation light in the fundamental mode.

As expressed by the curves C91 and C92 shown in FIG. 18, even when the number of hole layers is reduced to three, the bending loss of the fundamental mode hardly increases regardless of the wavelength. On the other hand, as expressed by the curves C111 and C112, the confinement loss of the higher-order mode remarkably increases with a reduction in the number of hole layers. Therefore, it is preferable that a smaller number of hole layers are used. On the other hand, as expressed by the curves C101 and C102, the confinement loss of the fundamental mode remarkably increases with a reduction in the number of hole layers. Therefore, it is preferable that three or more layers be used, because, upon performing an optical transmission over several tens km, it is preferable that the confinement loss be 0.1 dB/km or less in the fundamental mode, or more preferably, about $1.0 \times 10^{-4}$ dB/m or less.

The bending loss of the fundamental mode decreases with an increase in the number of hole layers and tendency that the confinement loss of the higher-order mode and the confinement loss of the fundamental mode reduces does not change in an area where the number of hole layers is six or more, which is not shown in FIG. 18. Therefore, it is preferable that the HF have seven or fewer layers because, in this case, the confinement loss of the fundamental mode is sufficiently small, the confinement loss of the higher-order mode is remarkably large, and furthermore, the number of holes to be formed can be reduced to 200 or less which makes it easier to manufacture the HF.

On the other hand, if the HF has eight or more layers, the confinement loss of the higher-order mode decreases and more holes are to be formed, which makes it difficult to manufacture the HF and furthermore to maintain a large effective area.

As described above, according to an aspect of the present invention, the wavelength dispersion of a holey fiber can be compensated over a remarkably broad wavelength band, which achieves broadband and large-capacity long-haul optical transmission using broadband characteristics of the holey fiber.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission system using an optical fiber as an optical transmission path that includes a holey fiber and a dispersion-compensating optical fiber, the optical transmission system comprising:
    a holey fiber which includes
        a core region that is formed at a center of the holey fiber, and
        a cladding region having a plurality of holes around the core region at regular intervals, the holes are arranged to form a triangular lattice, and $d/\Lambda=0.35$ to $0.65$, where $\Lambda$ is a lattice constant of the triangular lattice being in a range between 8 micrometers to 12 micrometers and d is a diameter of the hole in micrometers, a portion of the cladding region that does not include the plurality of holes has the same refractive index as a refractive index of every portion of the core region, and a dispersion-compensating optical fiber which includes
        a center core region;
        an inner core layer that is formed around the center core region and has a refractive index smaller than a refractive index of the center core region;
        an outer core layer that is formed around the inner core layer and has a refractive index lower than the refractive index of the center core region and higher than the refractive index of the inner core layer; and
        a cladding layer that is formed around the outer core layer and has a refractive index higher than the refractive index of the inner core layer and lower than the refractive index of the outer core layer, wherein
        a relative index difference, $\Delta$, between the center core region and the cladding layer is 1.4% to 3.0%,
        a relative index difference between the inner core layer and the cladding layer is $-1.0\%$ to $-0.1\%$,
        a relative index difference between the outer core layer and the cladding layer is 0.1% to 0.5%,
        a value $\alpha$ that defines a shape of the center core region is equal to or larger than 1.5, $\alpha$ is defined by $n^2(r) = n_{core}^2 \times \{1 - 2 \times (\Delta/100) \times (r/a)^\alpha\}$, where $0 < r < a$, r is a point from the center of the center core region in a radial direction, n(r) is the refractive index at the point r, $n_{core}$ is the refractive index at r=0 in the center core region, and a is a radius of the center core region,
        a ratio of diameter of the center core region to outer diameter of the outer core layer is 0.1 to 0.4, and
        a ratio of outer diameter of the inner core layer to the outer diameter of the outer core layer is 0.3 to 0.9, and
    wherein the dispersion-compensating optical fiber is connected close to the holey fiber and collectively compensates wavelength dispersion of the holey fiber at an operation wavelength in at least an entirety of three different wavelength bands selected from O band, E band, S band, C band, and L band within a predetermined range depending on a transmission rate.

2. The optical transmission system according to claim 1, wherein the dispersion compensating fiber compensates the wavelength dispersion of the holey fiber such that an absolute value of an average wavelength dispersion of the optical transmission path is equal to or smaller than 10 ps/nm/km.

3. The optical transmission system according to claim 2, wherein the dispersion compensating fiber compensates the wavelength dispersion of the holey fiber such that the absolute value of the average wavelength dispersion of the optical transmission path is equal to or smaller than 5 ps/nm/km.

4. The optical transmission system according to claim 1, wherein the holey fiber has an effective area equal to or larger than 45 $\mu m^2$ at the operation wavelength.

5. The optical transmission system according to claim 4, wherein the holey fiber has an effective area equal to or larger than 60 $\mu m^2$ at the operation wavelength.

6. The optical transmission system according to claim 1, wherein the holes form three to seven regular hexagonal layers surrounding the core region.

7. The optical transmission system according to claim 1, wherein the dispersion-compensating optical fiber has a cutoff wavelength shorter than a shortest operation wavelength in the at least three different wavelength bands.

8. The optical transmission system according to claim 1, wherein the dispersion-compensating optical fiber has a cutoff wavelength equal to or shorter than 1360 nanometers.

9. The optical transmission system according to claim 1, wherein the dispersion-compensating optical fiber has a wavelength dispersion equal to or smaller than −100 ps/nm/km at a wavelength of 1550 nanometers.

10. The optical transmission system according to claim 1, wherein a wavelength dispersion curve of the dispersion-compensating optical fiber has an inflection point at which a dispersion slope shifts from a negative value to a positive value at a wavelength from 1300 nanometers to 1800 nanometers.

* * * * *